United States Patent [19]
Lokun et al.

[11] 3,886,338
[45] May 27, 1975

[54] BAND OVERLAP DETECTOR SWITCH FOR CONTINUOUS RIBBON MANDREL

[75] Inventors: Terence M. Lokun, Conroe, Tex.; Peder Ulrik Poulsen, Fredensborg, Denmark

[73] Assignee: Owens-Corning Fiberglas Corporation, Toledo, Ohio

[22] Filed: Jan. 16, 1974

[21] Appl. No.: 433,962

[52] U.S. Cl. ........ 200/61.13; 200/61.18; 200/61.41; 226/45; 156/367; 156/429
[51] Int. Cl. ............................................ B65h 25/14
[58] Field of Search ............ 200/61.39, 61.4, 61.41, 200/61.42, 153 T, 329–340, 61.13–61.18; 340/259; 242/28, 36, 49, 57, 186, 187; 226/10, 15–17, 45; 156/425, 429, 367, 368

[56] References Cited
UNITED STATES PATENTS

| | | | |
|---|---|---|---|
| 2,867,794 | 1/1959 | Dillon | 200/61.41 X |
| 3,027,075 | 3/1962 | Howdle et al. | 200/61.41 |
| 3,215,793 | 11/1965 | Campbell et al. | 200/61.41 |
| 3,244,418 | 4/1966 | Henderson | 226/45 X |
| 3,264,631 | 8/1966 | Ege | 340/259 |
| 3,577,955 | 5/1971 | Palmer | 200/61.42 X |
| 3,666,598 | 5/1972 | Christie et al. | 156/425 X |
| 3,726,736 | 4/1973 | Wolfenden | 156/429 X |

*Primary Examiner*—James R. Scott
*Attorney, Agent, or Firm*—Carl G. Staelin; John W. Overman; Paul J. Rose

[57] ABSTRACT

The invention is an apparatus for detecting band overlaps and similar defects on an endless forming surface comprised of a continuous band helically wound in a plurality of side-by-side convolutions. The device comprises two members movably connected together and each being in contact with one of adjacent convolutions of the band. A sensing means, such as an electric switch, is mounted on one of the members and is actuated by movement of the other member in response to an overlap or other radial displacement of the corresponding convolution. The sensing means can be connected to the drive circuit for the band to automatically stop the drive when an overlap occurs.

2 Claims, 4 Drawing Figures

PATENTED MAY 27 1975　　　　　　　　　　　　　　3,886,338

BAND OVERLAP DETECTOR SWITCH FOR CONTINUOUS RIBBON MANDREL

The present invention relates to an apparatus for detecting band overlaps which may occur in the operation of a forming machine of which the forming surface comprises a plurality of side-by-side convolutions of a continuous band.

The invention is particularly suited for use with a continuous ribbon forming mandrel of the type described in U.S. Pat. Nos. 3,464,879 and 3,655,489. Briefly, such a mandrel comprises an endless metal band which is helically wound in abutting convolutions about a central support to form a cylindrical forming surface. The endless band extends back through the center of the support to connect the ends of the helix. The band advances continuously to provide a forming surface which both rotates about its axis and moves longitudinally along its axis.

The mandrel described is particularly useful for making large diameter tubular structures. Such tubes made of hardenable materials, such as glass fiber reinforced plastic, are used to make pipe, tanks, manholes, silos and other structures. The unique design of the mandrel makes it possible to produce tubing in continuous or indefinite lengths, and the mandrel is usually employed in a continuous process.

One problem which is frequently encountered in using the described continuous mandrel is that of overlapping of one or more of the convolutions of the band. The problem is most often encountered at the head or supported end of the machine between the first two convolutions. Such an overlap may result from a variety of causes including a build-up of resin and glass or other materials on the equipment, or excessive resistance to the advance of the band caused by a heavy laminate on the mandrel. Also, because mandrels of this type are typically very large, ranging in diameters up to 14 feet or greater and lengths to 20–30 feet, the problem of overlaps may result from the difficulty of tracking the extremely long band.

Whatever the cause, band overlaps produce serious consequences for a continuous process. If not caught very early the overlap may produce additional overlaps or will progress along the mandrel until it is in the zone where materials are being applied. Similarly the overlap causes additional stresses on the band and may cause the band to break resulting in considerable downtime for repairs.

Whenever a band overlap occurs it is necessary to shut down the machine as quickly as possible. The further the overlap progresses the more difficult it is to correct. When hardenable materials such as polyester resins are being applied to the mandrel a time related chemical reaction is involved. The catalyzed resins are self-curing, and if the mandrel is stopped, the cure advances back along the mandrel toward the supported end. Many resins, including polyesters, shrink upon curing. The shrinkage of the laminate exerts a considerable compressive force on the mandrel making it still more difficult to correct the problem and restart the machine. In many cases it is necessary to scrap the laminate on the mandrel and to remove it manually.

All of the above consequences result in a disruption of the continuous operation, in most cases for a considerable period, and an extra expense to the operation.

Therefore, it is the principal object of this invention to provide an apparatus for detecting overlaps between the convolutions of the endless band at the earliest possible time and for stopping the machine immediately.

In summary, the invention is an apparatus for use with an endless ribbon mandrel, and comprises at least two members in sliding or rolling contact with adjacent convolutions of the metal band. The members are connected together but movable with respect to each other when one of the convolutions begins to overlap the adjacent convolution. Means mounted on one of the members detects the relative movement of the members when a band overlap occurs and stops the endless band or ribbon. In a specific embodiment of the invention, one of the members is adapted to pivot relative to the other when moved radially of the mandrel by an overlapping convolution of the band. In this particular embodiment, when the first member pivots contact with a micro-switch is broken and the electrical circuit for the mandrel drive is opened to stop the mandrel.

Further features of the invention will be apparent from the detailed description which follows, reference being to the accompanying drawings which form a part of this specification and of which:

Figure 1:
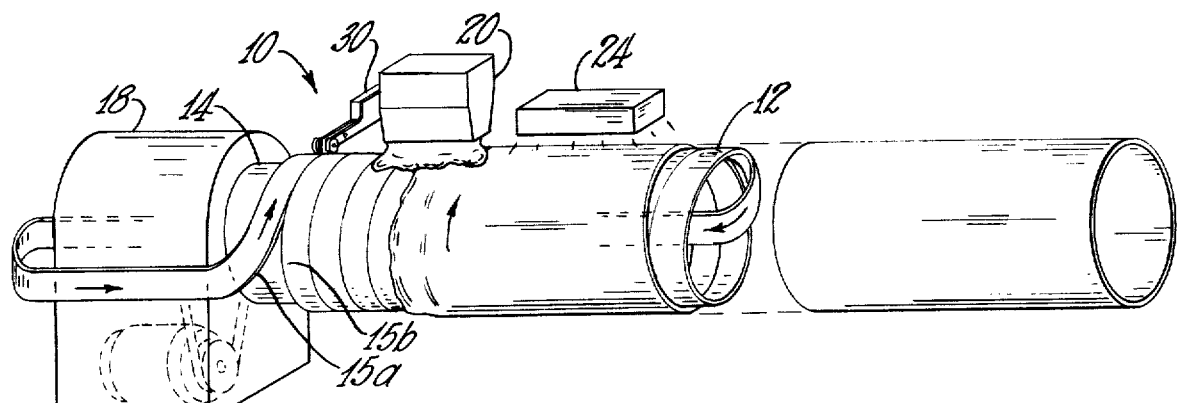
FIG. 1 shows an endless ribbon mandrel as used in a continuous process to make reinforced plastic tubing, and the use of the present invention in association with the mandrel.

The endless mandrel 10, shown in FIG. 1, and described more fully in U.S. Pat. No. 3,464,879, comprises an endless steel band 12 which recirculates about a core 14. The core is supported at the head of the machine 18, which also includes a drive 56 for the mandrel. The core is not supported at the opposite end. The major portion of the band is helically wrapped in abutting convolutions 15 around the periphery of the core to form a generally smooth forming surface on which materials can be applied. The band 12 can be driven separately or by the rotation of the central core 14 as shown in FIG. 1. In either case the band advances from the supported end of the core to the free end where it passes back through the center of the core to the supported end.

The mandrel surface rotates, and simultaneously advances toward the free end a distance of one band width per revolution. This motion of the mandrel surface makes it particularly well suited for the production of tubing in long or continuous lengths. In a typical process associated equipment, shown here generally as 20, deposits material on the forming surface to build the wall of the tubing. When the material application is extended over several band widths, the wall of the tubing is built-up in layers.

In one particular process where the apparatus of FIG. 1 finds use, the material applied are a thermosetting resin, glass fiber reinforcements in any of several forms, and optionally, a particulate filler or reinforcement such as sand. The process produces a composite wall comprising a predesigned ratio and arrangement of any or all of the aforementioned materials.

Although the resins used are catalyzed and will generate their own cure with time, a heat source, such as that indicated at 24 is often provided for better control of the cure rate. The cure of the composite takes place as it advances toward the free end of the mandrel and is substantially complete before the laminate advances off the mandrel surface. The continuous tubing is cut to length as it leaves the mandrel.

As mentioned earlier, among the other consequences of a band overlap, the self-generating cure of the thermosetting resins continues even when the mandrel has stopped. Many of the typical resins tend to shrink as cure takes place and thus they create a substantial compressive pressure on the mandrel. In some cases this pressure is so great it prevents reversing the mandrel or starting it moving again. In such cases damage to the mandrel itself is possible, and it is often necessary to remove the cured laminate by cutting, chipping, or otherwise physically destroying it.

Although it is possible for overlaps of the band 12 to occur anywhere along the mandrel, it has been observed that they usually occur between the first and second convolutions 15a and 15b. A typical cause is an excessive build-up of resin or other material on a portion of the core 14 which causes the first convolution to ride-up over the edge of the next adjacent convolution. As this is the typical problem situation, the apparatus of the invention which is indicated generally at 30, is shown in association with that region of the mandrel in FIG. 1.

Figure 2:
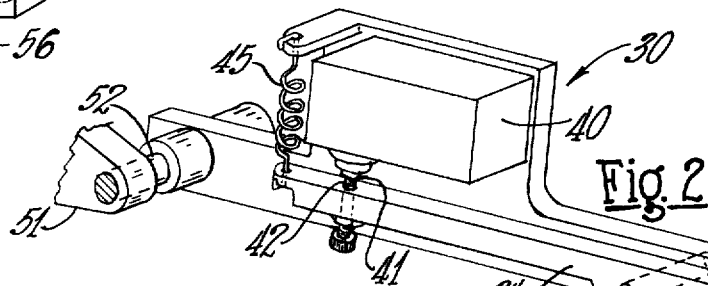
FIG. 2 shows the apparatus of the present invention with the convolutions of the mandrel in the correct operating relationship.
Figure 3:
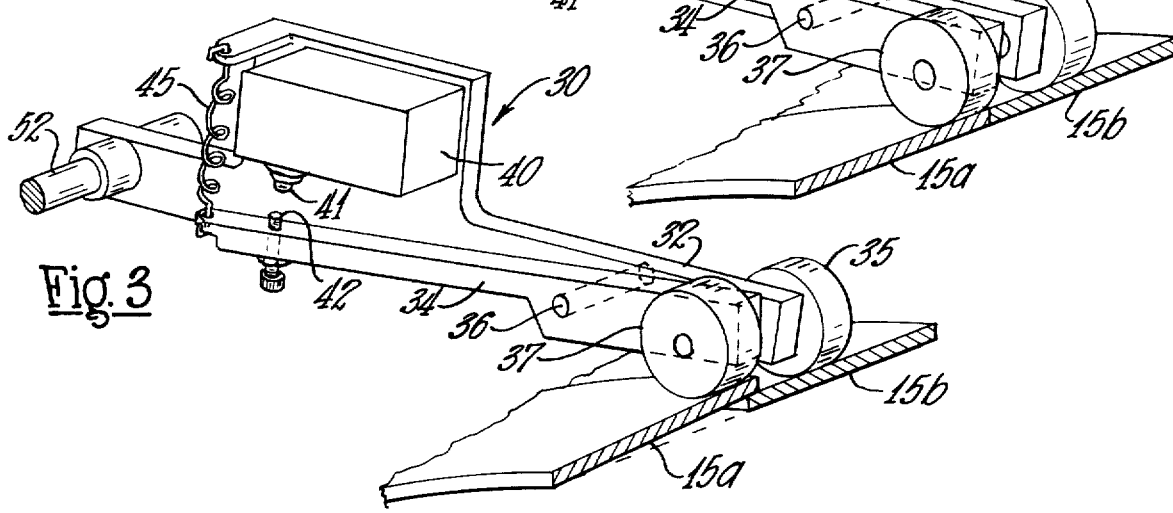
FIG. 3 shows the apparatus of the present invention with the convolutions of the mandrel in the overlapped or problem condition.

Referring now to FIGS. 2 and 3, the overlap detector 30 comprises two members 32 and 34 which are pivotably connected by the pin or axle 36. Cam followers or rollers 35 and 37 are connected to the distal end of members 32 and 34 respectively and contact the surface of the mandrel.

A limit switch 40 is mounted on an upstanding portion of member 32. The depressible actuator 41 of the limit switch is positioned to mate with a knob 42 on member 34. The knob 42 is threaded for adjustment according to the sensitivity desired.

A tension spring 45 connects the members 32 and 34 together at points on each at the opposite end from the cam followers 35 and 37. The spring maintains the member 32 and 34 in the proper relationship during normal operation.

The overlap detector 30 is mounted on an external support in the desired relationship to the mandrel 10. In FIG. 2, the detector is shown pivotably mounted by a clevis pin 52, connected to member 32, inserted in a fixed clevis 51. As shown in FIGS. 1 and 2, the detector is mounted such that its own weight will keep the rollers 35 and 37 in rolling contact with the top of the mandrel surface. It should be readily apparent that there are numerous other ways to support the detector 30 in contact with the mandrel surface, and that it can be positioned in different locations on the surface of the mandrel other than the top.

In FIG. 2, the overlap detector 30 is shown in position with the mandrel 10 under normal operating conditions. The cam follower 35 on member 32 is shown resting on the surface of convolution 15a representing the first winding of the metal band 12. The cam follower 37 on member 34 is shown resting on the adjacent convolution 15b. Since the two convolutions 15a and 15b are properly aligned side-by-side, the members 32 and 34 are generally axially aligned and the actuator 41 is depressed by the knob 42. The spring 45 keeps the cam follower 37 on the member 34 pressing against the mandrel surface and prevents it from skipping or bouncing on the rotating surface and prevents the member 34 from accidentally releasing the actuator 41 of the limit switch 40.

As shown in FIG. 2, the limit switch 40 is of the normally open type, and the actuator 41 is depressed during operation. In FIG. 3 the invention is shown with the convolution 15a overlapping convolution 15b. When such an overlap occurs, the cam follower 37 is raised radially of the mandrel surface causing the member 34 to pivot about the axle 36. The opposite end of member 34 pivots away from the limit switch and knob 42 releases the actuator 41 and permits switch 40 to open. Once the overlap has been corrected, spring 45 will return the member 34 to the correct operating position.

The apparatus of FIGS. 2 and 3 is broadly a sensing device for detecting radial displacement of one convolution relative to another. Accordingly the device can be used in a variety of ways according to the needs of the particular process. For instance, it can merely function to sound an alarm, it can be used to stop the operation, or conceivably it could be part of a system which automatically corrects the defect.

Figure 4:
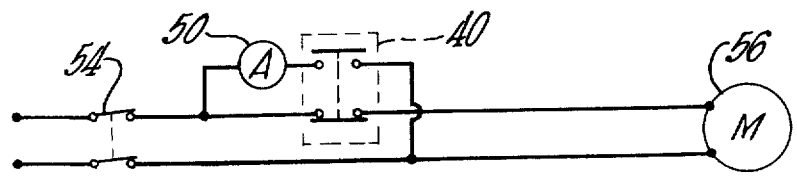
FIG. 4 is a schematic electrical diagram for a simple circuit showing the apparatus of the invention in operative relationship with the mandrel drive.

In FIG. 4, an electrical circuit is shown schematically and shows the switch 40 in operative combination with a stop-start switch 54, an alarm 50, and with the mandrel drive 56. The switch 40 is shown as having two pairs of stationary contacts and two movable bridging members, the bridging members being coupled together and disposed in such a manner that one pair of contacts is opened when the other pair is closed. The circuit is shown with normally open contacts of the switch 40 in the closed position, as when the actuator 41 is depressed by the knob 42, and the circuit through the mandrel drive complete, which represents the operating condition.

When the normally open contracts of the switch 40 are opened, as when the actuator 41 is released by the knob 42 then the circuit through the mandrel drive 56 is broken, stopping the mandrel. Simultaneously, the circuit through the alarm 50 is closed, setting off the alarm and alerting the operator of the overlap condition.

It has been observed that the overlap detector 30 is effective to detect band overlaps as soon as as they occur. Consequently, the operator can quickly correct the condition, for example, by reversing the mandrel or by physically pushing the overlapping convolution into place. Accordingly, although simple devices responsive to the overlap detector for automatically correcting the overlap are readily conceivable, such additional devices have not been needed in the described operation.

Although the invention has been only briefly described with reference to one embodiment as shown, it is readily apparent that other embodiments and modifications will occur to those skilled in the art and are within the scope of the invention as defined in the claims which follow.

We claim:

1. A band overlap detecting apparatus for a continuous ribbon mandrel having an endless forming surface provided by a continuously helically advanceable band helically wound in a plurality of side-by-side convolutions and having electric driving means for the band, comprising a first elongated member having a first end portion in operative engagement with a first one of the convolutions and an opposite second end portion mounted to accommodate pivotal movement of the member about an axis generally parallel to the axis of the helix defined by the helically wound band, a second elongated member spaced from the first member axially of the helix and extending generally parallel to the first member, the second member having a first end portion in operative engagement with a second one of the convolutions immediately preceding the first one operatively engaged by the first member, means mounting the second member on the first member at intermediate portions respectively thereof for pivotal movement of the second member with respect to the first member about an axis generally parallel to the axis of the helix, electric switch means mounted on one of the members and disposed between the mounted second end portion of the first member and the axis of pivotal movement of the second member with respect to the first member, the switch means having a pair of normally open contacts and a depressible actuator closing the contacts when depressed to complete a circuit through the electric driving means for the band, actuator depressing means mounted on the other of the members and engageable with the actuator of the switch means, and biasing means operatively connected to a second end portion of the second member and urging the actuator depressing means and the actuator toward each other to maintain the contacts of the switch means closed during normal operation of the mandrel, the biasing means also urging the first end portion of the second member rotatably about the axis of pivotal movement of the second member and toward the second convolution, whereby upon undesired overlapping of the first convolution by the second convolution, the second member is pivoted against the force of the biasing means to release the actuator and permit the contacts of the switch means to open and interrupt the circuit through the driving means for the band.

2. A band overlap detecting apparatus as claimed in claim 1 wherein the switch means also includes a pair of normally closed contacts opened when the actuator is depressed, and alarm means connected in parallel across the circuit through the driving means for the band and activated upon release of the actuator and closing of the normally closed contacts.

* * * * *